March 31, 1931.                N. C. WARD                1,798,287
                                CONDENSER
                           Filed Nov. 19, 1927

Inventor:
Neil C. Ward
By
    Atty.

Patented Mar. 31, 1931

1,798,287

UNITED STATES PATENT OFFICE

NEIL C. WARD, OF CHICAGO, ILLINOIS

CONDENSER

Application filed November 19, 1927. Serial No. 234,525.

This invention relates to solidified electrolytes, particularly for use in dry batteries, condensers, rectifiers, and the like.

It contemplates more especially the provision of a solidified electrolyte as an expedient in battery, rectifier and condenser construction.

Storage batteries have heretofore been employed with much success for varied purposes and a liquid electrolyte has almost universally been employed. Liquid electrolytes preclude convenient transportation of such batteries and require much care in the use thereof. Further, battery casings for liquid electrolytes must be made of high quality material, entailing much labor and expense to prevent leakage as well as to avoid the dilution and adulteration of the electrolyte.

Condensers and rectifiers have also been made with liquid or moist separating media to which, of course, there is serious objection.

One object of the present invention is to simplify the construction and improve the operation of devices of the character mentioned.

A further object is the provision of spaced plates having means in association therewith to carry an electrolyte in its dry state.

A still further object is the provision of paper, asbestos, metal or other media intermediate spaced plates to carry salts in their dry state and in contact with said plates.

Other objects of the invention and its advantages will appear from the following description of an illustrative embodiment of the present invention.

Figure 1:
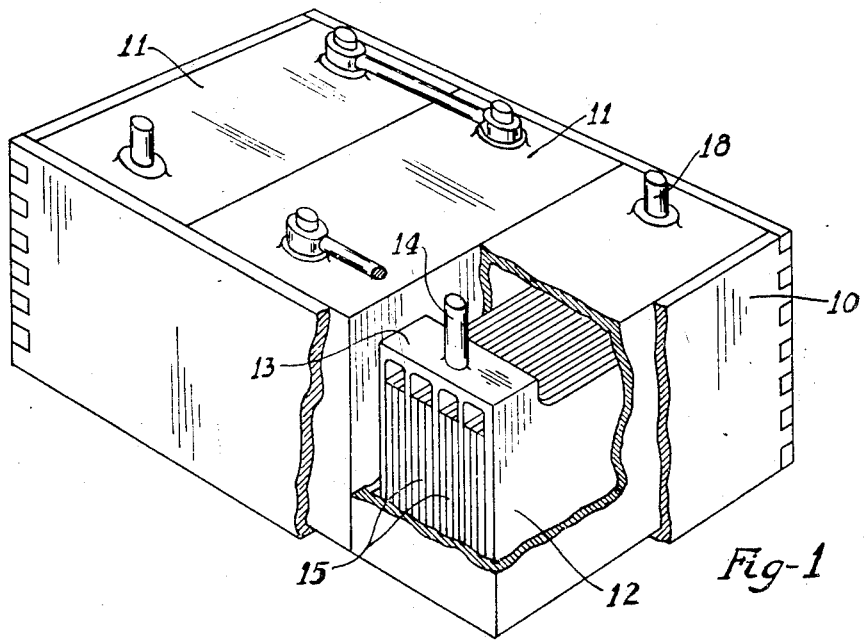
Figure 1 is a perspective view of a battery embodying features of the present invention, portions thereof being removed to clarify the showing.
Figure 2:
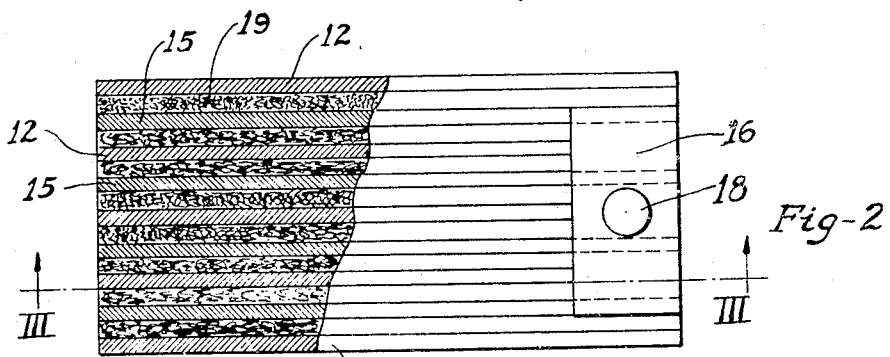
Figure 2 is a plan view of a cell employed in connection with the battery disclosed in Figure 1.
Figure 3:
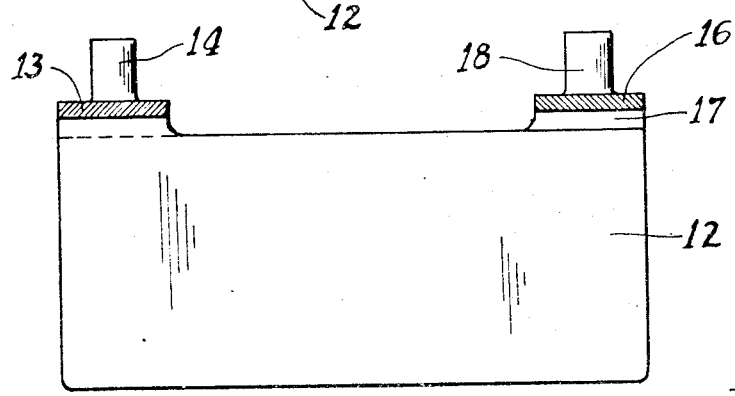
Figure 3 is a sectional view in elevation taken substantially along the line III—III of Figure 2.

The structure selected for illustration comprises a battery casing 10 having one or more cells 11 confined therein for connection in series to produce the desired storage battery voltage required for any desired purpose.

Each of the cells 11 is composed of a series of spaced plates 12 of suitable configuration conductively connected to each other by a conductor plate 13 which terminates in a terminal 14, the plates being composed of lead or other material suitable as an electrode for creating electrolytic production.

Another series of plates 15 conforming in shape with the plates 12 are disposed therebetween in alternating spaced relation therewith for connection with an extension 17 in much the same way as the conductor 13 connects the plates 12. The plates 15 may be a metallic material different from that of the plates 12 as aluminum to receive a suitable electrolyte therebetween, or plates 15 may be of the same material as plates 12 when particular electrolytes are used as is well known in the art. The plates 15 are connected to the terminal 18 which with the terminal 14 constitute the leads from the electrodes.

The electrolyte in some instances may be introduced in its dry state betwen the plates 12 and 15. It may also be introduced by means of a suitable carrier such as the filter paper 19, the paper being saturated with a solution of the electrolyte and thereafter completely dried. Asbestos may be employed, or other material carrying a coating or impregnation of a proper salt. The metal plates 12 and 15, also, when feasible, may be coated with the electrolyte in its dry state and then brought together.

Absorbent material, and particularly filter paper, may be impregnated with the electrolyte after it has been wound or after it has been placed in the container with the plates, the operation comprising the saturation of the paper with a solution of the electrolyte and subsequent drying out.

The filter paper 19 or other carrier subjected to disposition between the plates 12 and 15 of the battery shown in the attached illustration, may be impregnated with any suitable salt such as sodium, magnesium, or ammonium sulphate, or borax in solution. Thereafter the carrier should be dried in any suitable manner so that the electrolytic solution is converted to a dry state for association with the plates 12 and 15. The filter paper or other carrier 19 may conform substantially in area and configuration with the plates 12 and 15 whereby to provide contact with the entire surface area thereof.

When the solidfied electrolyte hereinabove referred to be employed in condenser construction it is usual to employ such solidified electrolyte between a plate of aluminum, and another plate of either lead, iron, or some metal other than aluminum. Filter or blotting paper, or asbestos sheets, are saturated with a solution of sodium sulphate, sodium bicarbonate, and other sodium or ammonium salts, and then dried until all semblance of the moisture of the solution is removed therefrom.

The saturated paper, thus dried, is interposed between the aluminum plate and the plate of another metal. A gas or oxide is formed upon the aluminum plate, and is adapted to provide the dielectric required between the two condenser plates.

In this manner, a very compact condenser of very high capacity is obtainable. The electro-chemical decomposition of the salt forming a part of the solidified electrolyte is essential to the success of the device, but once the decomposition has set in, the performance of the condenser is even and generally highly efficient. About a dozen or more salts have been employed experimentally, all with a fair degree of success, but of course some are more efficacious than others.

Other plates than those here proposed may be employed, and it is apparent that quite a number of different salts than those experimented with may also be used. Preferably, the heating of the solidified electrolyte during the drying process to which it must be subjected, is carried to an extent that there are no traces of moisture left in the salt suspended upon and becoming a part of the absorbent material.

Various changes may be made in the embodiment of the invention herein specifically described without departing from or sacrificing any of the advantages thereof as defined in the appended claims.

For rectifiers, similar solidified electrolytes may be employed. As the heat generated during rectification is high, asbestos may be most successfully employed as the carrier. Heat has no tendency to damage the asbestos base, hence long life is assured. Any suitable circuit, as for example a circuit employed with a liquid electrolyte, may be made a part of the rectifying apparatus in which the solidified electrolyte is used.

An example of a rectifier comprises a carrier impregnated with Rochelle salts having at opposite sides a copper and an aluminum plate. The current will not flow from the aluminum to the copper for aluminum oxide, a dielectric, forms upon the aluminum plate. A second example of such a device is a carrier plate of an absorbent impregnated with copper sulphide or ammonium sulphide and separating a copper and an aluminum plate.

I claim:

1. In a condenser, the combination with spaced plates of filming material, of absorptive material intermediate said plates, and a normally liquid electrolyte reduced to a dry state carried by said absorptive material.

2. In a condenser, the combination with spaced plates of filming material, and absorptive material disposed intermediate said plates, said absorptive material being impregnated with a normally liquid electrolyte dried therein and in contact with said plates.

3. For use in a condenser having a series of spaced plates of filming material, a solidified electrolyte intermediate said plates and comprising a solid body having an external surface of a normally liquid electrolyte reduced to a dry state and suspended by such body.

4. In a condenser, the combination with a series of spaced plates of filming material, terminals connected to alternate plates, filter paper disposed between said plates, and a normally liquid electrolyte dried to a solid state in said filter paper.

NEIL C. WARD.